Figure 1:
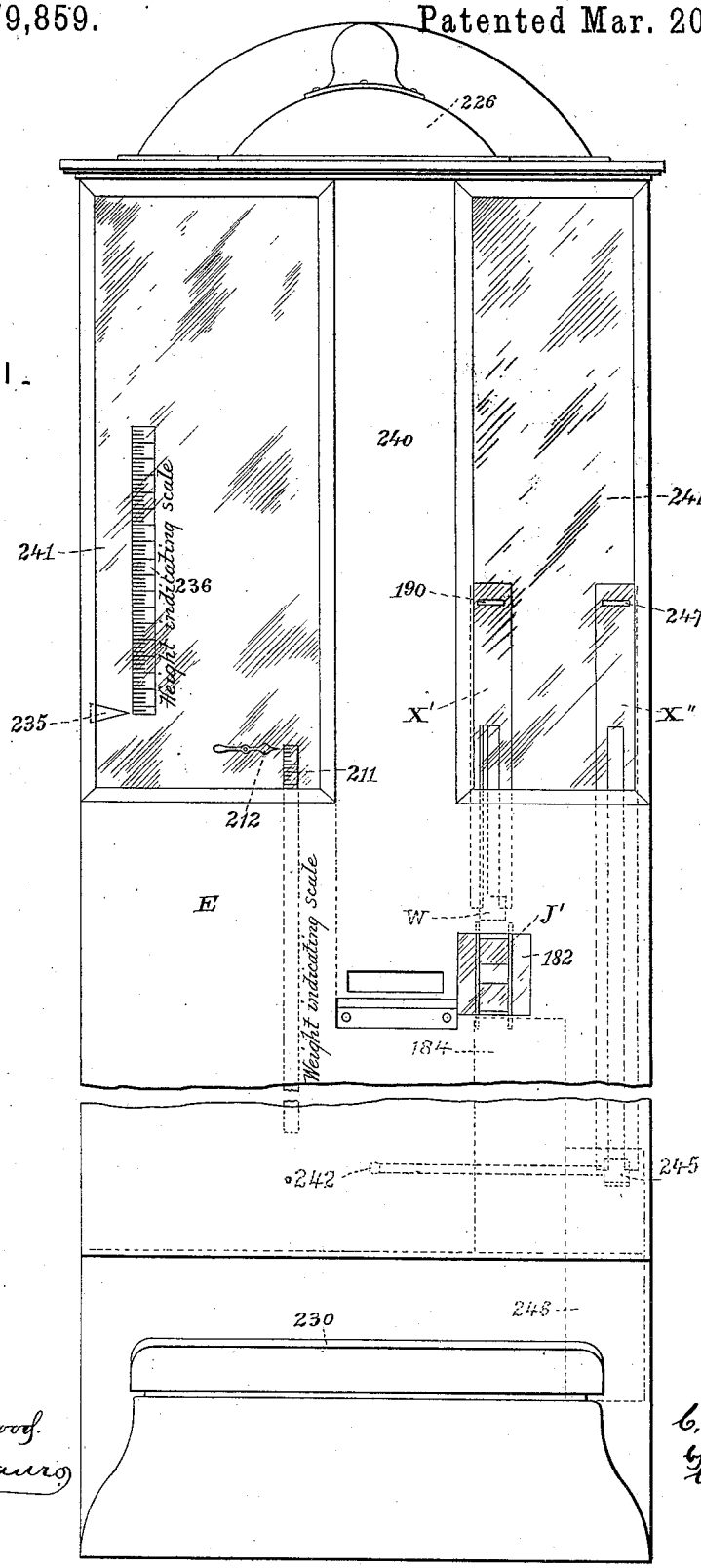

(No Model.) 4 Sheets—Sheet 1.

C. C. CLAWSON.
MACHINE FOR DETERMINING OR INDICATING THE HEIGHT AND THE WEIGHT OF PERSONS.

No. 379,859. Patented Mar. 20, 1888.

(No Model.) 4 Sheets—Sheet 2.
C. C. CLAWSON.
MACHINE FOR DETERMINING OR INDICATING THE HEIGHT AND THE WEIGHT OF PERSONS.
No. 379,859. Patented Mar. 20, 1888.
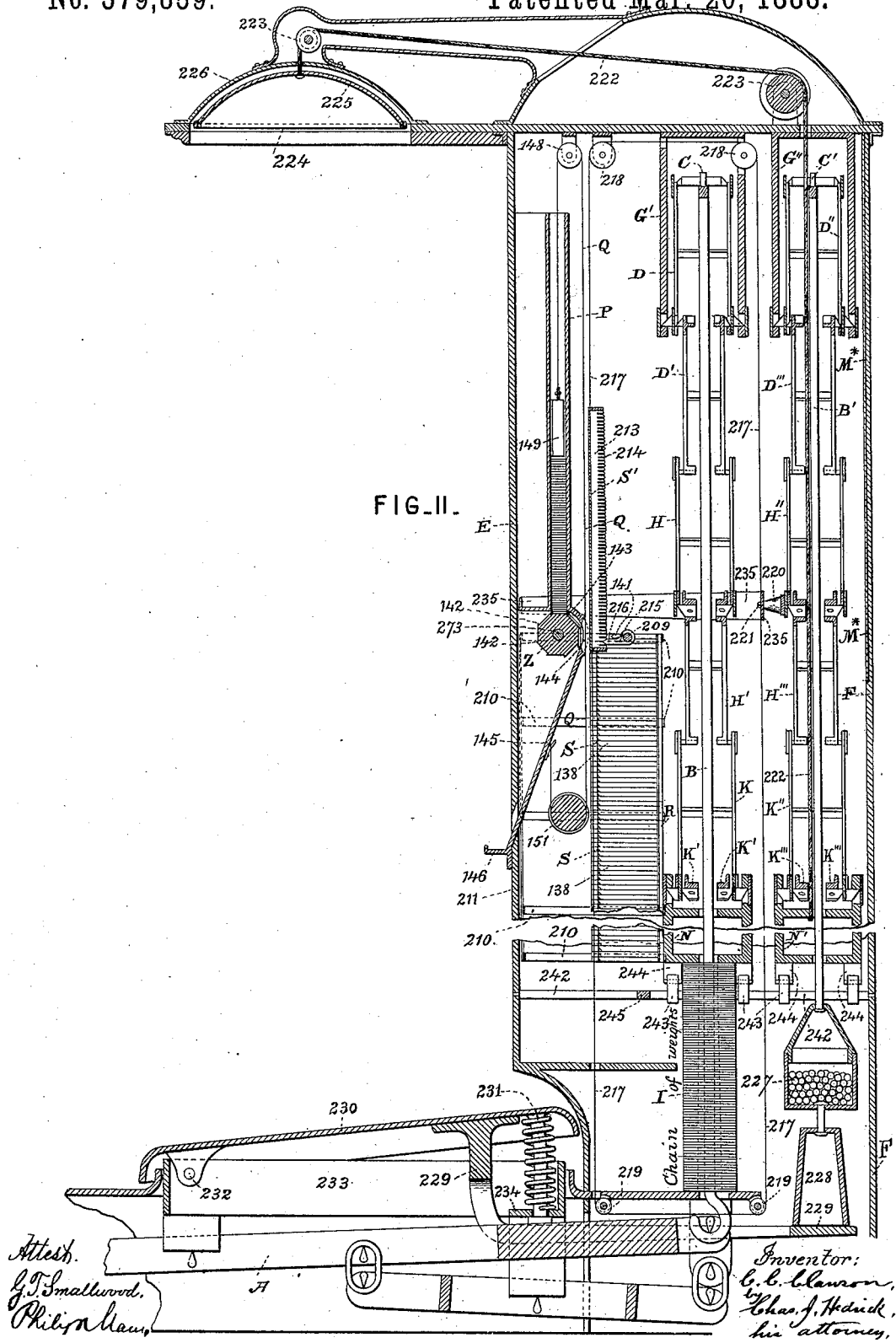
FIG. II.

(No Model.) 4 Sheets—Sheet 3.
C. C. CLAWSON.
MACHINE FOR DETERMINING OR INDICATING THE HEIGHT AND THE WEIGHT OF PERSONS.
No. 379,859. Patented Mar. 20, 1888.
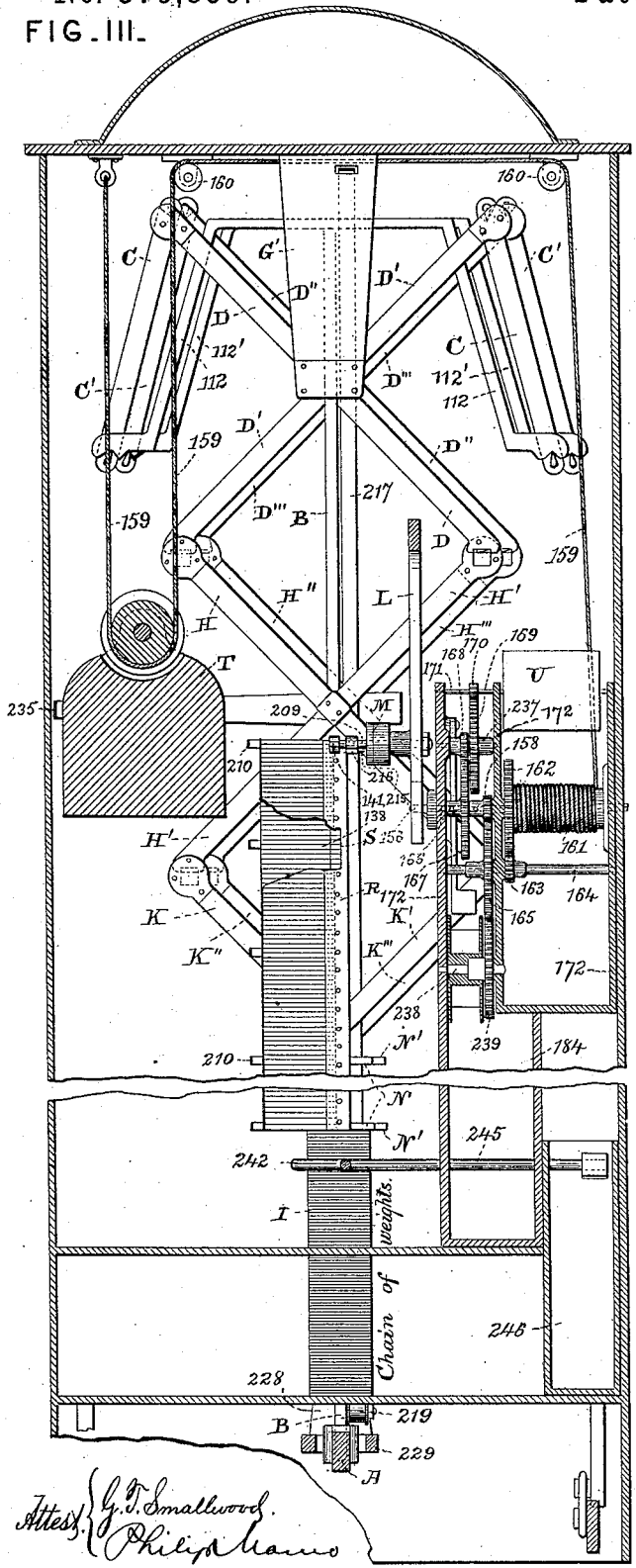
FIG. III.
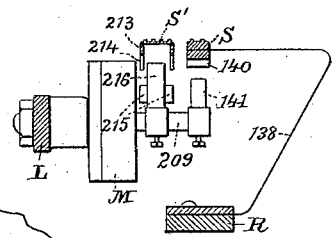
FIG. V.
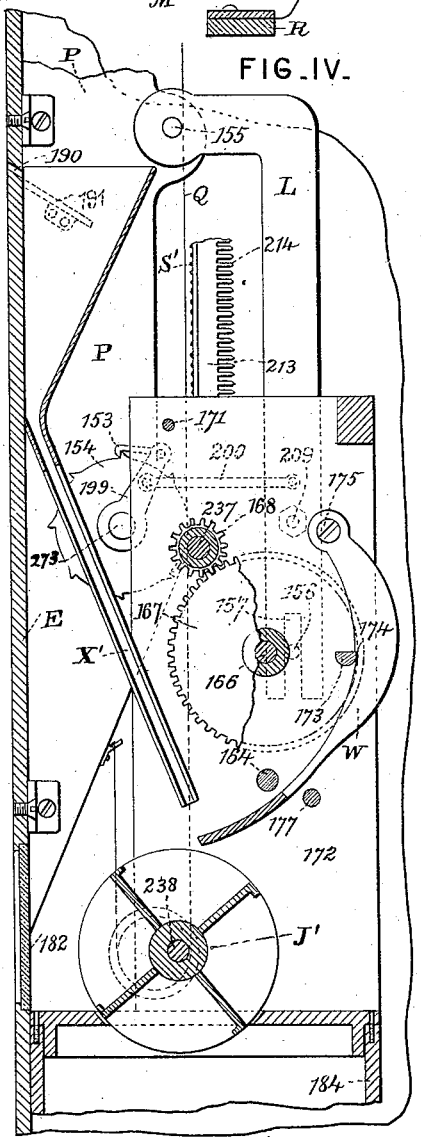
FIG. IV.

(No Model.) 4 Sheets—Sheet 4.
C. C. CLAWSON.
MACHINE FOR DETERMINING OR INDICATING THE HEIGHT AND THE WEIGHT OF PERSONS.
No. 379,859. Patented Mar. 20, 1888.
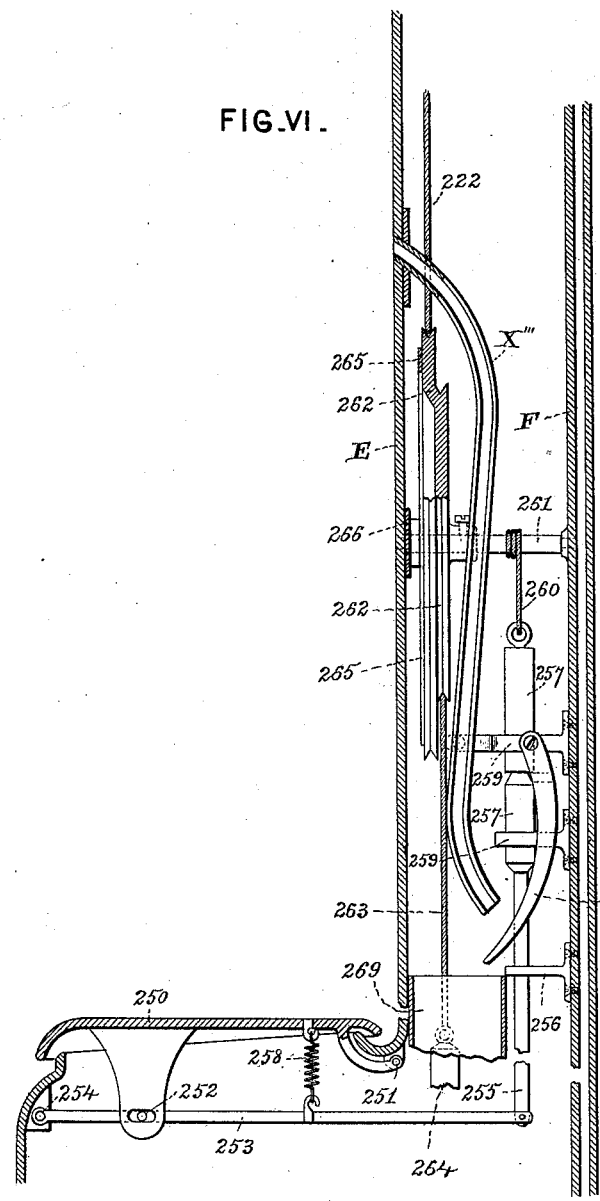
FIG. VI.
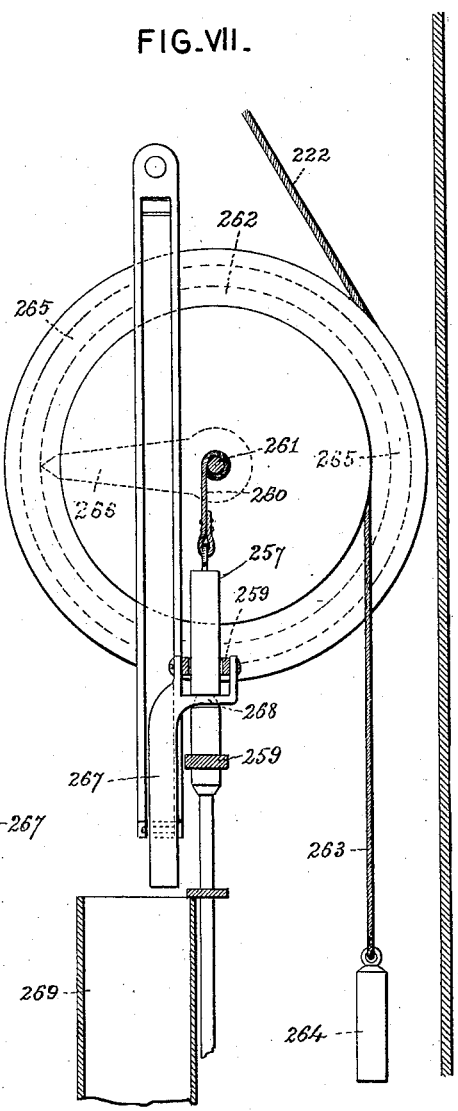
FIG. VII.

UNITED STATES PATENT OFFICE.

CLEMENT COLERIDGE CLAWSON, OF NEWARK, NEW JERSEY, ASSIGNOR TO THE UNITED STATES MACHINE AND INVENTIONS COMPANY, OF NEW YORK, N. Y.

MACHINE FOR DETERMINING OR INDICATING THE HEIGHT AND THE WEIGHT OF PERSONS.

SPECIFICATION forming part of Letters Patent No. 379,859, dated March 20, 1888.

Application filed June 7, 1887. Serial No. 240,507. (No model.)

*To all whom it may concern:*

Be it known that I, CLEMENT COLERIDGE CLAWSON, a citizen of the United States, residing at Newark, Essex county, New Jersey, have invented certain new and useful Improvements in Machines for Indicating or Determining the Height and the Weight of Persons, of which the following specification is a full, clear, and exact description.

This invention relates more particularly to a machine by which a person can ascertain his height and weight on introducing a proper coin or coins or token or tokens into the said machine. Some of the improvements are, however, applicable to height-measuring or to weighing or to combined height-measuring and weighing machines generally, some to coin-motors generally, and some of them may be used in machines for other purposes.

The invention consists, mainly, in the following features and improvements:

First. In order to measure a person's height it is and has been customary to provide a vertically-movable device to rest upon the person's head. According to the present improvement, a printing-form or series of printing-type is combined with such a movable device so as to be adjusted or controlled in position thereby, and means are provided for taking an impression from the appropriate type. An indication is thus given by a record which is or may be permanent. The height may or may not, in addition, be indicated by a scale, a pointer, or other instrument which shows the height temporarily. Practically type mounted on a suitable yielding support or supports, so that the type can be separately pushed out to print, are employed, and their use is especially contemplated; but the combination with printing-type generally being new, the improvement is not restricted to type with a yielding support or supports.

Second. A ticket printing and delivery mechanism having movable type is combined with a vertically-movable device of the character specified, and also with a coin-controlled power-driven mechanism which operates said ticket printing and delivery mechanism. By this general combination the person receives or may receive a ticket printed with his height on the introduction of a proper coin or coins into the machine.

Third. Weighing and height-measuring appliances are combined with printing mechanism in such a way that the weight and height of a person are or may be printed on one card or ticket, and the printing and delivery of such a card or ticket is or may be controlled by a suitable coin-motor.

The invention further comprises the special features, improvements, and combinations hereinafter pointed out.

In the accompanying drawings, Figures I to V represent a coin-controlled weighing, height-measuring and weight and height printing machine, constructed in accordance with the invention, Fig. I being a front elevation, Fig. II a vertical longitudinal section, Fig. III a vertical cross-section looking to the rear, Fig. IV a partial view in longitudinal section on an enlarged scale, and Fig. V a partial view in horizontal section on an enlarged scale. Figs. VI and VII are partial views of a modified form of height-measuring machine in longitudinal section and in cross-section, respectively, the view in cross-section (Fig. VII) looking to the front.

Referring to the machine as represented in Figs. I to V, the lever A of an ordinary platform-scale is connected with the lower end of the scale-rod B, whose branched head 112 is connected by links C with the upper ends of the crossed levers D D', these latter being fulcrumed in the stationary hanger G', and having their lower ends connected through the suspended crossed levers H H', links K K', and suspended hanger N with the series of scale-weights I.

Between the branched head 112 and the links C, between the links C and the levers D D', at the fulcrum of the levers D D', between the levers D D' and the levers H H', at the middle of the levers H H', between the levers H H' and the links K K', and between the links K K' and the hanger N are hinge-joints formed by knife-edges, as described at length in my application for a patent filed April 21, 1887, No. 235,672, for a weighing and weight-printing machine. When, therefore, the scale-rod B is pulled down, the levers D D' are turned, the levers H H' and links K K' are lifted and turned, and the hanger N is raised directly upward, the motion of the rod B being multiplied by the levers or lazy-tongs. The scale-weights I are connected with each other in a sort of chain, so that they are successively lifted.

The type-carrier R, in the form of a straight bar, is fastened in a vertical position to the front of the hanger N. The type S (of metal) are cast separately and are each fastened at the outer end of a bowed metal spring, 138, (see Fig. V,) whose inner end is secured to the carrier R, the same as in my said application. The type are of course adjusted by the movement of the hanger N and type-carrier R, and they are so arranged that the type which is at any time in a position to print represents the weight then on the scale. Each type has a tooth, 140, at the back to insure the correct position of the type in printing. The printing is effected by means of a finger, 141, on a pin, 209, which is fastened to and projects laterally from the printing-lever L. When the finger 141 is moved forward, it presses out the type which is then in its path, so as to give an impression upon a card or ticket, as hereinafter explained. The type-carrier R also has attached to it by means of arms 210 (see Fig. II) a weight-indicating scale, 211, which is movable in front of a stationary pointer, 212, so as to give a visible indication of the result of each weighing, in addition to the printed record thereof.

Alongside and above the weight-printing type S are the height-printing type S'. These are formed on a soft-rubber strip which is secured at the top and bottom to an open rectangular frame, 213, (see Figs. II and V,) so as to extend over the front of the said frame. The sides of the frame are provided at the back with teeth 214, for engaging projections 215 on the sides of the finger 216, which presses out the type S' to print the results of the height-measurings. This finger 216 is fixed on the pin 209, alongside the finger 141, and, as shown, is arranged a little below the latter, (see Fig. III,) so as to print on a different line. This relative position is of course not essential. On the pin 209 are also the wheels M, forming a dating-stamp.

The type S' and frame 213 are attached to the ends of a flexible steel band, 217, which runs over pulleys 218 at the top and pulleys 219 at the bottom of the standard of the machine, and is connected with a system of crossed levers or lazy-tongs similar to or identical with that which forms part of the weighing-scale. The crossed levers D'' D''' of this system are fulcrumed in the stationary hanger G'', and have their lower ends connected through the suspended crossed levers H'' H''' and links K'' K''' with the suspended hanger N'. The connection with the band 217 is made at the middle of the lever H'' by a bracket, 220, attached to said lever H'' and provided with a journal-pin, 221, which fits in a hole in the band, in which hole it is free to turn.

The suspended hanger N' is connected by a cord or wire, 222, (which runs over pulleys 223,) with the device which is to rest upon the head of the person whose height is to be measured. This device is placed over the scale-platform, as shown, and consists of a plate or membrane, 224, extended over the mouth of an inverted bowl, 225, to which latter the end of the wire 222 is secured. When the hanger N' rises the device 224 descends, and at the same time the type S', being connected with the lazy-tongs D'' D''' H'' H''' through the steel band 217, also descend to a proportionate, although not to the same, extent. The band 217 is connected with the lever H'' (instead of with the hanger N', which might be done) in order to reduce the motion of said type. Normally the device 224 is kept up in its housing 226 by the preponderating weight of the hanger N' and the suspended levers H'' H''' and links K'' K'''. It is caused to descend by the action of the weights 227 and 228 at the lower end of the rod B', whose branched upper end, 112', Fig. III, is connected by the links C' with the upper ends of the levers D'' D''', just as the branched head 112 is connected with the levers D D' by the links C. When these weights are both suspended from the rod B' and are also assisted by the weight of the inverted bowl and membrane or plate at the outer end of the wire 222, they overcome by force of gravity the weight of the hanger N' and the suspended levers D'' D''' and H'' H''' and links K'' K''', and allow the device 224 slowly to descend. When the device 224 is arrested and the weight taken off the outer end of the wire 222, the hanger N' and its supporting-levers and links overcome the pull of the weights 227 and 228 and further movement is stopped. When the hanger, levers, and links preponderate, notwithstanding the weight at the outer end of the wire 222, they raise the device 224 into its housing, as shown. Normally the weight 228 is supported by the arm 229, which projects from the hinged platform 230, and is kept in a raised position by springs 231, and when this platform is depressed it allows the weight 228 to hang from the rod B'.

The platform 230 is hinged at 232 to the frame 233, which is supported by the scale-beams and kept in position by links or radius-bars, as is common in scales. The springs 231 are interposed between the platform 230 and ears 234 on the inside of the frame 233.

In order to give a visual indication of the height measured, a bent arm, 235, is journaled on the bracket 220 and fastened to the band 217, and this arm carries a pointer which indicates the height on a stationary scale, 236.

The weight of the parts which are attached to the supporting-levers or lazy-tongs on one side is or may be balanced by ordinary mechanical means.

The cards upon which the weights and heights are to be printed are placed in the card-box P, Fig. II, and presented to the type S and S' by means of the feeder or many-sided feed-roller Z. This is revolved step by step and has projections 142, each of which in turn catches the bottom card and pushes it through an open space, 143, at the back of the box into the curved case 144, which holds the cards in place on the roller until they have passed in front of the two sets of type S and S' and been printed upon. After being printed they are discharged down the incline 145 and through the slot at the bottom thereof onto the outside shelf, 146.

The case 144, opposite the two printing-fingers 141 and 216 and the dating-wheels M, is cut away, and between the type and the feeder Z is a carbon or ink-ribbon, Q, so that by moving forward the printing-lever L, Figs. III and IV, which, as before stated, carries the printing-fingers 141 and 216 forward, the card opposite is impressed with the date and also with the numbers on those type S and S' which at the time are opposite the fingers 141 and 216, respectively.

The ribbon Q runs over the pulley 148 at the top of the standard and is connected with the pressure weight or follower 149, which rests upon the cards and descends as they are successively removed. Its opposite end is fastened to the back of the incline 145, and a weight, 151, suspended in the bight of the ink-ribbon, keeps it stretched.

The feeder Z is turned step by step by the pawl 153, Fig. IV, carried by the lever-arm 199, fulcrumed on the end of shaft 273 of the the feeder Z, said pawl engaging the ratchet 154, fixed on the said shaft. The arm 199 is connected by a link, 200, with the printing-lever L. The printing is done on the forward stroke of the lever L, and the pawl moves the feeder on the return-stroke, so that the newly-printed card is at once discharged.

The printing-lever L is pivoted at 155 to the card-box P, and is reciprocated by the crank-pin 156 engaging the slot 157 in the lower end of the lever. The pin projects from a disk fast on the shaft 166, which is revolved by the weight T, Fig. III, through an ordinary clock-work comprising gears 162, 163, 165, and 158, and provided with a regulating-fan, U.

The weight T is suspended in the bight of the wire cord 159, which runs over pulleys 160, and is wound upon the drum 161. The spur-wheel 162 turns with the drum 161, and from it the motion is conveyed to the shaft 166 through the pinion 163, shaft 164, spur-wheel 165, and pinion 158 of the clock-work. The fan U is driven through the spur-wheel 167, fast on the shaft 166, the pinion 168, and the spur-wheel 169 on the shaft 237, and the pinion 170, fast in the fan-shaft 171.

The various shafts are journaled in bearings of a frame, 172, fastened to or made a part of the top of the money-box 184.

Attached to and projecting from the side of the spur-wheel 167 is an escapement-pin, 173, which engages the tooth 174 on the escapement-lever W and arrests the movement of the clock-work.

The lever W is pivoted at 175, and is so weighted that the tendency is to hold the tooth 174 in the path of the pin 173; and there are also stops formed by the pin 177 on the frame 172 and the shaft 164, which limit the motion of the lever.

The front end of the lever which receives the coin underlies the discharging end of the inclined coin-spout X', so that the coin falling upon the lever will disengage it from the pin 173 and release the clock-work. The spout X' is cut away lengthwise in the middle, (see Figs. I and IV,) so as to hold the proper coin by the edges and to allow the smaller coin to drop out without reaching the escapement-lever W. The coin is introduced into the upper end of the spout X' through the slot 190. To prevent tampering with the escapement, the upper end of the spout is placed some distance below the slot, and as a further assurance an inclined plate, 191, may be used, as indicated in dotted lines, Fig. IV. When the coin, after releasing the clock-work, drops off of the lever W, it is received in one of the compartments of the supplemental coin-holder, which is in the form of a compartment-wheel, J', mounted on a horizontal shaft, 238, carrying a spur-wheel, 239, which is driven by the wheel 165. (See Fig. III.) The gearing is such that the compartment-wheel is given a quarter-turn for each revolution of the shaft 166. This quarter-turn brings the newly-introduced coin into view behind the transparent pane 182, and at the next operation of the coin-motor discharges it into the money-box 184.

In order to increase the interest of the public in the machine, the front E of the standard (and other parts also, if desired) is made, at least in part, of transparent glass, there being preferably an opaque middle strip, 240, by which the card-box P and the feeder Z, the printing-lever L, and the spout X' are supported, and on either side of this strip glass doors 241. A mirror, M*, is or may be provided at the back of the machine to reflect the parts.

As hereinbefore described, when a person steps on the platform of the machine, his weight immediately operates the height-measuring appliances and also the balancing mechanism, so that both sets of type S S' are adjusted properly without the introduction of a coin, since the described coin-motor, composed of the escapement-lever W, controls only the mechanism for giving the impressions and delivering the tickets. It is, however, designed not to have the machine operate at all unless a proper coin is introduced into the same. A second coin-motor is therefore provided, which is arranged to lock the machine until it is acted on by a proper coin. As shown, this motor comprises a shaft, 242, Fig. II, journaled in the front E and back F of the standard, bent around the weights I and rod B', and provided with hooked arms 243, which engage catches 244 on the bottom of the hangers N and N'. There is also a lever-arm, 245, Figs. I and III, whose outer end underlies the discharging end of an inclined coin-spout, X''', (see Fig. I,) so that the impact and pressure of the coin on the arm 245 turns the shaft 242 and releases the hangers N and N'. The coin, after it has acted upon the lever-arm 245, drops into the money-box 246, which, as shown, is separate from the box 184. The last-mentioned coin-motor also controls the visual indications of the weight and height, which are given irrespective of the card printing and delivering mechanism, and the said coin-motor could be usefully employed for this purpose alone, or for the purpose alone of releasing the weighing and height-measuring mechanism, the means shown for visually indicating the weight or height being omitted or otherwise controlled.

The coin to operate this coin-motor—composed of the rock-shaft 242, its hooked arms 243, and operating lever-arm 245—is introduced through the slot 247, that to operate the escapement-lever W being introduced through the slot 190, as before stated.

When a person desires to ascertain his weight and height with this machine, he first steps upon the platform 230 and places himself directly under the device 224. His weight presses the platform down and allows the weight 228 to hang from the rod B', and it also tends to draw up the hanger N and lift the scale-weights I. The tendency of the weight 228 to move the height-measuring appliances and the tendency of the person's weight to move the balancing mechanism are, however, resisted by the hooked arms 243 engaging the catches 244 on the hangers N N'. The person weighing then introduces, through the slot 247 (see Fig. I) at his right hand, a proper coin, which falls through the spout X'' onto the lever-arm 245, turns the shaft 242 and its arms 243, disengages the catches 244, and releases the hangers N and N'. The weight of the person, previously resisted by the engagement of the arms 243 with the catches 244 of hanger N, now forces down the lever A and rod B, turns the levers D D', turns and lifts the levers H H', and lifts the hanger N, raising the weights I successively and moving the weight-printing type S in front of the printing-finger 141 and the weight-indicating scale 211 in front of the pointer 212 until equilibrium is established. At the same time the weights 227 and 228 draw down the rod B', turn the levers D'' D''', turn and lift the levers H'' H''', and lift the hanger N', lowering the height-printing type S' in front of the printing-finger 216, raising the pointing-arm 235 over the stationary height-indicating scale 236, and lowering the device 224 until the motion is arrested by the said device resting upon the person below.

The motion of the hanger N may be moderated by any ordinary or suitable means—such, for example, as the clutch with wings or fans to be acted upon by the air, so as to apply the clutch when moved rapidly, as described in my said application—and the like means may be used on the hanger N', but are considered unnecessary, as the various weights can be adjusted to give a sufficiently slow motion. When the levers come to rest, the pointer 212 will indicate the weight and the pointer 235 the height. The two sets of type S S' have also been adjusted; but no impression has been taken from them. If the person is satisfied with the visual indication of his weight and height, he steps off the platform and the parts return automatically to their first position; but if he wishes to secure a ticket printed with his weight and height he remains on the platform and introduces a coin into the slot 190 at his left hand. By its impact and pressure it moves the escapement-lever W and releases the clock-work, and it then falls into the supplemental coin-holder J'. The clock-work is revolved by the weight T and moves the printing-lever L forward through the crank-pin 156, so as to press the proper types S and S' and the dating-wheels M against the card, with the ink-ribbon Q interposed. The printing-finger 141 enters between two of the teeth 140 on the back of the type S, and holds the latter from vertical motion with or without first adjusting the same, and the projections 215 on the finger 216 have a like action upon the teeth 214 on the frame 213, which carries the type S'. After the printing takes place the printing-lever L is returned, the feeder or feed-roller Z is turned one step, discharging the newly-printed card, introducing a blank card in its place, and withdrawing a card from the card-box P. After one revolution the clock-work comes to rest, leaving the coin exposed to view behind the glass 182, where it remains until the next coin is introduced, so that an attempt to employ a bogus coin may by this exposure be detected. When the person steps off of the machine, the platform 230 rises, lifts the weight 228 and both sets of levers or lazy-tongs, and the parts connected therewith then return to their original positions, in which they are locked by the engagement of the hooked arms 243.

In Figs. VI and VII the platform 250, hinged at 251 to the machine-frame, is connected at 252, by a slot-and-pin connection, with the lever 253, fulcrumed at 254 and jointed at the opposite end to the rod 255, which is guided by the bracket 256 and presses against the bottom of the weight 257, so as to uphold the same as long as the platform 250 and the rod 255 are kept up by the spiral tension-spring 258, interposed between the lever 253 and the platform. The weight 257, guided by brackets 259, is attached to the lower end of a cord, 260, which is wound on the spindle 261. This spindle is journaled in the front E and back F of the standard, and carries the disk 262. A cord or wire, 263, fastened at one end to the disk and resting in one of the peripherical grooves, is connected at the opposite end with the suspended weight 264, while the cord or wire 222, which is connected with the device to rest upon the person's head whose height is to be measured, lies in the other groove and is fastened at its inner end to the disk 262. A height-indicating scale, 265, is attached to the face of the disk 262, and a stationary pointer, 266, is employed in connection with said scale.

The front E of the standard is made transparent in whole or in part, so that the scale, or a proper portion of the same, and also, if desired, the working of the machine, may be seen. A latch, 267, has a tooth, 268, which can take into a notch in the weight 257 in order to support the same, and thus to prevent the movement of the disk 262 until said latch is released. The lower end of the latch underlies the discharging end of the spout X''', so as to be acted upon by a coin delivered by said spout. Just below the latch 267 is the top of the money-box 269. The weight 257, assisted by the weight of the parts attached to the outer end of the wire or cord 222, overbalances the effect of the weight 264, but is overbalanced by the latter when not thus assisted. When a person wishes to ascertain his height by this machine, he steps upon the platform 250 and introduces a proper coin into the upper end of the spout X'''. The coin on its way into the money-box 269 forces back the latch 267, releases the weight 257, which descends (the rod 255 having been moved by the depression of the platform 250 when the person stepped on the same) and turns the disk 262, allowing the device at the end of the wire 222 to descend and rest upon the head of the person. The motion of the disk is thereby arrested, and the height of the person will be indicated on the portion of the scale 265 opposite the pointer 266. When the person steps off of the scale, the spring 258 raises the rod 255, which pushes up the weight 257 and allows the disk 262 to be turned backward by the descent of the weight 264. In this machine height only is indicated, and that by usual indication.

Modifications may be made in details without departing from the spirit of the invention, and parts of the invention may be used separately.

A detailed description has been given of the machines shown, by way of example, for the purpose of better enabling others to make and use the invention and not to restrict the invention thereto.

For greater certainty it may be here stated that the term "indicator," as hereinafter employed, includes means for giving temporary indication, for making a record, or for indicating by both methods. As shown, there is a double indicator for weight and also for height, so that a temporary visual indication is given in each case, as well as a printed record of the result. The "vertically-moving device of a height-measurer," as employed herein, is that device of any suitable form which in operation determines the measurement by resting on the head of the person to be measured, and "balancing mechanism" includes the counterpoise, (represented in the machine shown by the scale-weights I,) whose counterbalancing effect increases with the motion, and mechanical connections in general for conveying the pressure to said counterpoise.

I claim as my invention or discovery—

1. The combination, with the vertically-movable device of a height-measurer, of movable printing-type, especially type which can be pushed out separately to print, adjusted or controlled by said device, and means for taking an impression from said type, substantially as described.

2. The combination, with the vertically-movable device of a height-measurer, of ticket printing and delivering mechanism comprising movable printing-type, especially type which can be pushed out separately to print, adjusted or controlled by said device, power-driven mechanism for operating said ticket printing and delivery mechanism, and a coin-motor which controls said power-driven mechanism, substantially as described.

3. The combination, with the vertically-movable device of a height-measurer, of vertically-movable printing-type, especially type which can be pushed out separately to print, adjusted or controlled by said device, a horizontally-moving printing-finger, an upright card-box, and a feeder which takes the cards from said box and presents them in front of said printing-finger, substantially as described.

4. The combination, with the balancing mechanism of a weighing-scale and the vertically-movable device of a height-measurer, of two sets of printing-type, especially type which can be pushed out separately to print, adjusted or controlled by the said balancing mechanism and the said vertically-movable device, respectively, and means whereby an impression may be taken from both sets of type on one card or ticket, substantially as described.

5. The combination, with the balancing mechanism of a weighing-scale and the vertically-movable device of a height-measurer, of ticket printing and delivering mechanism having two sets of type, especially type which can be pushed out to print, adjusted or controlled by the said balancing mechanism and the said movable device, respectively, a power-driven mechanism for operating said ticket printing and delivering mechanism, and a coin-motor which controls said power-driven mechanism, substantially as described.

6. The combination, with the two separately-adjustable sets of vertically-movable type, especially type which can be pushed out to print, the horizontally-movable printing-fingers, the upright card-box, and the feeder which takes the cards from said box and presents them in front of said printing-fingers, substantially as described.

7. The combination, with the vertically-movable device of a height-measurer and the balancing mechanism of a weighing-scale, of the two sets of vertically-movable type, especially type which can be pushed out separately to print, the printing-fingers, the card-box, and the feeder, substantially as described.

8. The combination, with the vertically-movable device of a height-measurer, of a height-indicator and the system of levers through which the movement of the said device is communicated to said indicator, substatially as described.

9. The combination, with the vertically-movable device of a height-measuring machine, of means, such as a counterpoise, whereby said device is kept in an elevated position, a movable platform under said device, and means connected with the platform for causing the said device to descend when the platform is depressed, substantially as described.

10. The combination, with the vertically-movable device of a height-measuring machine, of the counterpoise for keeping the said device elevated, the overbalancing-weight for causing the said device to descend, the movable platform under said device, and a support for said overbalancing-weight connected with said platform, so as to be removed when the platform is depressed, substantially as described.

11. The combination, with the vertically-movable device of a height-measuring machine, of means, such as a counterpoise, whereby said device is kept normally in an elevated position, a movable platform under said device, means connected with said platform for causing the said device to descend, and a coin-motor having a detent which prevents the descent thereof until said detent is released, substantially as described.

12. The combination, with the vertically-movable device of a height-measuring machine, of means, such as a counterpoise, for keeping the same elevated normally, and means for causing the same to descend when required, the printing-type adjusted by said device, and the means for taking an impression therefrom, substantially as described.

13. The combination, with the vertically-movable device of a height-measuring machine, the means, such as a counterpoise, for keeping the said device normally elevated, and the means for causing the same to descend, of ticket printing and delivery mechanism having the type adjusted by said device, substantially as described.

14. The weighing-scale having the platform movable independently of the weighing appliances, in combination with height-measuring appliances having a vertically-movable device which is kept normally in a raised position, and means connected with said platform for causing the said device to descend, substantially as described.

15. The combination, with yielding printing-type and a printing-finger for pushing out the same to give an impression, of type holding or adjusting teeth at the side or sides of said type, and a projection or projections at the side or sides of said finger for engaging said teeth, substantially as described.

16. The combination, with the clock-work, arranged in a case provided with a coin-slot, and the escapement for said clock-work, arranged at a distance from said slot and operating to release the said clock-work under the impact or pressure of a coin, of the supplemental coin-holder, in the form of a compartment-wheel mounted on a horizontal axis and geared to said clock-work, so as to be revolved thereby, substantially as described.

17. The combination, with the balancing mechanism and the height-measuring appliances, of detents which engage the balancing mechanism and the height-measuring appliances, and a coin-motor which controls both detents, substantially as described.

18. A machine for weighing, measuring, or weighing and measuring persons, comprising a platform, an upright glass case or standard, a mirror at the back of said case or standard, and coin-controlled machinery exposed to view in said case or standard and reflected in said mirror, substantially as described.

19. A weighing-machine having a movable platform, an upright glass case or standard, and a coin-controlled balancing mechanism connected with said platform and exposed to view behind the glass of said case or standard, so that the automatic adjustment of said balancing mechanism takes place in the sight of the person on the platform on the introduction of a coin, substantially as described.

20. A machine for weighing, measuring, or weighing and measuring persons, comprising a movable platform, an upright glass case, and coin-controlled machinery in part connected with said platform and in part operated by stored power exposed to view in said case, substantially as described.

21. A machine for weighing, measuring, or weighing and measuring persons, comprising one or more sets of adjustable type and coin-controlled machinery for automatically adjusting said type and for taking impressions therefrom, substantially as described.

22. A weighing and weight-printing machine comprising a movable platform, an upright glass case or standard, a balancing mechanism connected with said platform, a series of printing-type adjusted by said balancing mechanism, ticket printing and delivery mechanism, and a clock-work for operating said last-named mechanism, the said clock-work, as well as the balancing mechanism, being coin-controlled and exposed to view in said case or standard, substantially as described.

23. A machine for weighing, measuring, or weighing and measuring persons, comprising an upright glass case or standard, and coin-controlled ticket printing and delivery mechanism driven by a clock-work exposed to view behind the glass of said case or standard, substantially as described.

24. A coin-controlled weighing-machine comprising an upright glass case or standard, and in said case or standard a balancing mechanism, a ticket printing and delivery mechanism, a clock-work for operating said ticket printing and delivery mechanism, and a money-box, the said balancing mechanism and ticket printing and delivery mechanism being supported by the frame of the machine, and the said clock-work by the money-box, substantially as described.

25. The case having a solid strip up the middle of the front and glass on each side of said strip, in combination with the card-box, feeder, printing-lever, and coin-spout supported by said strip, a set or sets of lazy-tongs suspended from the top of said case, the money-box, and the clock-work with coin-operated escapement supported on the money-box, substantially as described.

26. The combination, with a counterpoise and the system of crossed and jointed levers for conveying pressure thereto, of the coin-motor having a detent at the lower end of said system of levers for locking the same until released by a coin, substantially as described.

27. The combination, with the counterpoise of a weighing-scale, especially a counterpoise composed of a chain of weights, and the system of crossed and jointed levers for conveying to the said counterpoise the pressure to be balanced thereby, of a visual-indicator adjusted or controlled by said levers and counterpoise, substantially as described.

28. The combination, with the system of crossed and jointed levers, of the vertically-movable device of a height-measurer connected with said levers at the lower end, and an indicator connected with said levers nearer the principal fulcrum, so as to have the motion reduced, substantially as described.

29. The described coin-controlled weighing and height-measuring machine, comprising, in combination, the weighing-scale, the height-measuring appliances, the card printing and delivery mechanism having type adjusted by said scale and said appliances, respectively, and a coin-motor or coin-motors, substantially as set forth.

30. The combination, with a movable instrument for giving visual indication, a ticket printing and delivery mechanism having movable type, and mechanism for adjusting said instrument and said type, of two coin-motors, one controlling the adjusting mechanism and the other the operation of said ticket printing and delivery mechanism, substantially as described.

In testimony whereof I have signed this specification in the presence of two witnesses.

CLEMENT COLERIDGE CLAWSON.

Witnesses:
　E. A. MEAD,
　MICHAEL BYRNE.